US010440355B2

(12) United States Patent
Trail et al.

(10) Patent No.: US 10,440,355 B2
(45) Date of Patent: Oct. 8, 2019

(54) DEPTH MAPPING WITH A HEAD MOUNTED DISPLAY USING STEREO CAMERAS AND STRUCTURED LIGHT

(71) Applicant: Facebook Technologies, LLC, Menlo Park, CA (US)

(72) Inventors: Nicholas Daniel Trail, Bothell, WA (US); Alexander Jobe Fix, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 185 days.

(21) Appl. No.: 15/342,036

(22) Filed: Nov. 2, 2016

(65) Prior Publication Data
US 2017/0134717 A1 May 11, 2017

Related U.S. Application Data

(60) Provisional application No. 62/252,279, filed on Nov. 6, 2015.

(51) Int. Cl.
*H04N 13/00* (2018.01)
*H04N 13/344* (2018.01)
(Continued)

(52) U.S. Cl.
CPC ........... *H04N 13/344* (2018.05); *G06T 7/521* (2017.01); *G06T 7/593* (2017.01); *G06T 19/006* (2013.01);
(Continued)

(58) Field of Classification Search
CPC ............. H04N 13/044; H04N 13/0239; H04N 13/0253; H04N 13/0022; G06T 19/006
See application file for complete search history.

(56) References Cited

U.S. PATENT DOCUMENTS 5,442,462 A * 8/1995 Guissin ................... G06T 5/002
358/447
7,990,460 B2 * 8/2011 Wenstrand ............. G02B 7/005
348/345
(Continued)

FOREIGN PATENT DOCUMENTS

EP 1620902 A2 2/2006
GB 2541970 A 3/2017

OTHER PUBLICATIONS

PCT International Search Report and Written Opinion, PCT Application No. PCT/US2016/060364, dated Jan. 12, 2017, 11 pages.
(Continued)

*Primary Examiner* — Shawn S An
(74) *Attorney, Agent, or Firm* — Fenwick & West LLP

(57) ABSTRACT

A an augmented reality (AR) headset includes a depth camera assembly that combines stereo imaging with structured light (SL) to generate depth information for an area of interest. The depth camera assembly includes at least two image capture devices and a SL illuminator and determines an imaging mode based on a signal to noise ratio or spatial variance of images captured by one or more of the cameras. Different imaging modes correspond to different operation of one or more image capture devices and the SL illuminator. The depth camera assembly includes different ranges of signal to noise ratios that each correspond to an imaging mode, and the depth camera assembly configures the image capture devices and the SL illuminator based on an imaging mode associated with a range of signal to noise ratios including the signal to noise ratio of a captured image.

11 Claims, 6 Drawing Sheets

(51) Int. Cl.
*H04N 13/128* (2018.01)
*H04N 13/254* (2018.01)
*G06T 19/00* (2011.01)
*H04N 13/239* (2018.01)
*G06T 7/521* (2017.01)
*G06T 7/593* (2017.01)

(52) U.S. Cl.
CPC ......... *H04N 13/128* (2018.05); *H04N 13/239* (2018.05); *H04N 13/254* (2018.05); *G06T 2207/10024* (2013.01); *G06T 2207/10048* (2013.01)

(56) References Cited

U.S. PATENT DOCUMENTS

| | | |
|---|---|---|
| 2003/0232455 A1 | 12/2003 | Tanaka |
| 2008/0279446 A1 | 11/2008 | Hassebrook et al. |
| 2010/0182340 A1 | 7/2010 | Bachelder et al. |
| 2013/0242262 A1 | 9/2013 | Lewis |
| 2013/0293468 A1* | 11/2013 | Perez .................... G06F 3/033 345/158 |
| 2014/0198185 A1* | 7/2014 | Haugen ................ G06T 7/0008 348/48 |
| 2014/0340424 A1 | 11/2014 | Ellsworth |
| 2015/0193949 A1 | 7/2015 | Katz et al. |
| 2016/0254638 A1* | 9/2016 | Chen ................... H04N 13/254 362/11 |
| 2016/0335773 A1* | 11/2016 | Romano ................ G06T 15/50 |
| 2017/0134717 A1* | 5/2017 | Trail .................... G06T 19/006 |
| 2018/0045941 A1* | 2/2018 | Gao ...................... G02B 21/06 |

OTHER PUBLICATIONS

European Patent Office, European Search Report, European Patent Application No. 18204692.0, dated May 10, 2019, 8 pages.

* cited by examiner

DEPTH MAPPING WITH A HEAD MOUNTED DISPLAY USING STEREO CAMERAS AND STRUCTURED LIGHT

CROSS-REFERENCE TO RELATED APPLICATIONS

This application claims the benefit of U.S. Application No. 62/252,279, filed Nov. 6, 2015 which is incorporated by reference in their entirety.

BACKGROUND

The present disclosure generally relates to augmented reality systems or virtual reality systems and more specifically relates to headsets for virtual or augmented reality systems that obtain depth information of a local area.

Virtual reality (VR) systems, which may include augmented reality (AR) systems, can leverage the capture of the environment surrounding a user in three dimensions (3D). However, traditional depth camera imaging architectures are comparably large, heavy, and consume significant amounts of power. For example, time-of-flight (both direct-detect pulses and encoded waveforms), structured light (SL), and stereo vision are commonly used camera architectures for obtaining 3D information of a scene. Within SL architectures, asymmetrical camera design having a single camera and single SL source with a known baseline distance is a commonly used framework for capturing 3D scene information. In an asymmetrical camera design, 3D information for a scene is provided by a mapping of a structured light pattern into the overlapping camera field-of-view. However, measurement results of a SL design are impacted by having an in-band background light level in the local area being imaged. For example, in cases where a brightness of background light of a local area spans multiple orders of magnitude (equal to or brighter than an apparent intensity of the SL source), a SL solution degrades (as the signal of interest is eventually lost in a photon-noise limit of the source of the background light). Time-of-flight (ToF) architectures experience similar performance degradation under increasing ambient brightness. However, without at least minimum background brightness through a controlled or uncontrolled ambient source, stereo vision is unable to capture 3D scene information.

SUMMARY

A headset included in an augmented reality (AR) system or in a virtual reality (VR) system includes a depth camera assembly (DCA) enabling the capture of visual information in ambient light conditions with a variety of dynamic ranges. The DCA includes multiple image capture devices (e.g., a camera, a video camera) configured to capture images of a local area surrounding the DCA (also referred to as a "local area") and a structured light (SL) source configured to emit a SL pattern onto the local area. The SL pattern is a specified pattern, such as a symmetric or quasi-random grid or horizontal bars. Based on deformation of the SL pattern when projected onto surfaces into the local area, depth and surface information of objects within the local area is determined. The image capture devices capture and record particular ranges of wavelengths of light (i.e., "bands" of light).

The DCA is configured to capture one or more images of the local area using the one or more image capture devices. Different image capture devices in the DCA are configured to capture images including portions of the SL pattern projected by the illumination source (i.e., a "SL element") or to capture representations of the local area in fields of view of different image capture devices. In some embodiments, at least a set of the captured images include one or more SL elements.

The DCA operates in various imaging modes. These modes are determined based on light conditions of the local area. Different imaging modes correspond to different operation of the SL illuminator and various image capture devices of the DCA. In various embodiments, the DCA determines a signal to noise ratio (SNR) of one or more images captured by an image capture device of the DCA and compares the SNR to various ranges of SNRs maintained by the DCA. Each range of SNRs is associated with a different imaging mode. The DCA configures operation of the SL illuminator and the one or more image capture devices based on an imaging mode range of SNRs that includes the determined SNR. In addition to the SNR, the DCA may also determine a contrast ratio associated with one or the one or more images. In an embodiment, both the determined SNR and the contrast ratio are used to determine an imaging mode. In some embodiments, the determined SNR is a combination of contrast ratio and SNR. In still other embodiments, the DCA also determines a spatial variance of the one or more images captured by an image capture device of the DCA and compares the determined spatial variance to maintained ranges of spatial variances that are each associated with an imaging mode. The DCA configures operation of the SL illuminator and the one or more image capture devices based on an imaging mode associated with a range of SNRs including the determined SNR and associated with a range of spatial variances including the determined spatial variance.

In one embodiment, the DCA maintains a threshold value and an additional threshold value that is less than the threshold value. If the determined SNR equals or exceeds the threshold value, the DCA configures multiple image capture devices to capture images of the local area in a color space (e.g., in a red, blue, green color space) and deactivates the SL illuminator. Capturing color images or the local environment form both cameras allows determination of high-resolution depth information of the local environment based on pixel to pixel correlation between images captured by different image capture devices.

However, if the determined SNR is less than the threshold value and greater than the additional threshold value, DCA configures the SL illuminator to project the SL pattern onto the local area. Additionally, the DCA configures an image capture device to capture images of the local area in a color space (such as red, blue, green) and configures another camera to capture images of the local area in a range of wavelengths including wavelengths with which the SL illuminator projects. Additionally, the DCA retrieves image data from the image capture device and from the other image capture device synchronously or asynchronously to interleave the image data retrieved from the image capture devices to obtain depth information about the local area. Retrieving image data from different image capture devices simultaneously or within a threshold amount in time or space (relative to motion) provides information to fill in shadows in image data within image data captured by an image capture device based on separation between the different image capture devices.

If the determined SNR is less than or equal to the additional threshold value, the DCA configures the SL illuminator to project the SL pattern onto the local area. Additionally, the DCA configures an image capture device and an additional image capture device to capture images of the local area in a range of wavelengths including wavelengths projected by the SL illuminator. For example, if ambient light in the local area is low enough for the determined SNR to be below the additional threshold value, the DCA configures the image capture device and the additional image capture device to capture wavelengths between approximately 750 and 900 nanometers. Hence, in this configuration, the DCA captures information about the local area in wavelengths used by the SL illuminator. Based on image data of the SL pattern projected onto the local area obtained from the image capture device and from the additional image capture device, the DCA performs coarse and fine stereo matching to obtain coarse depth information about the local area.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
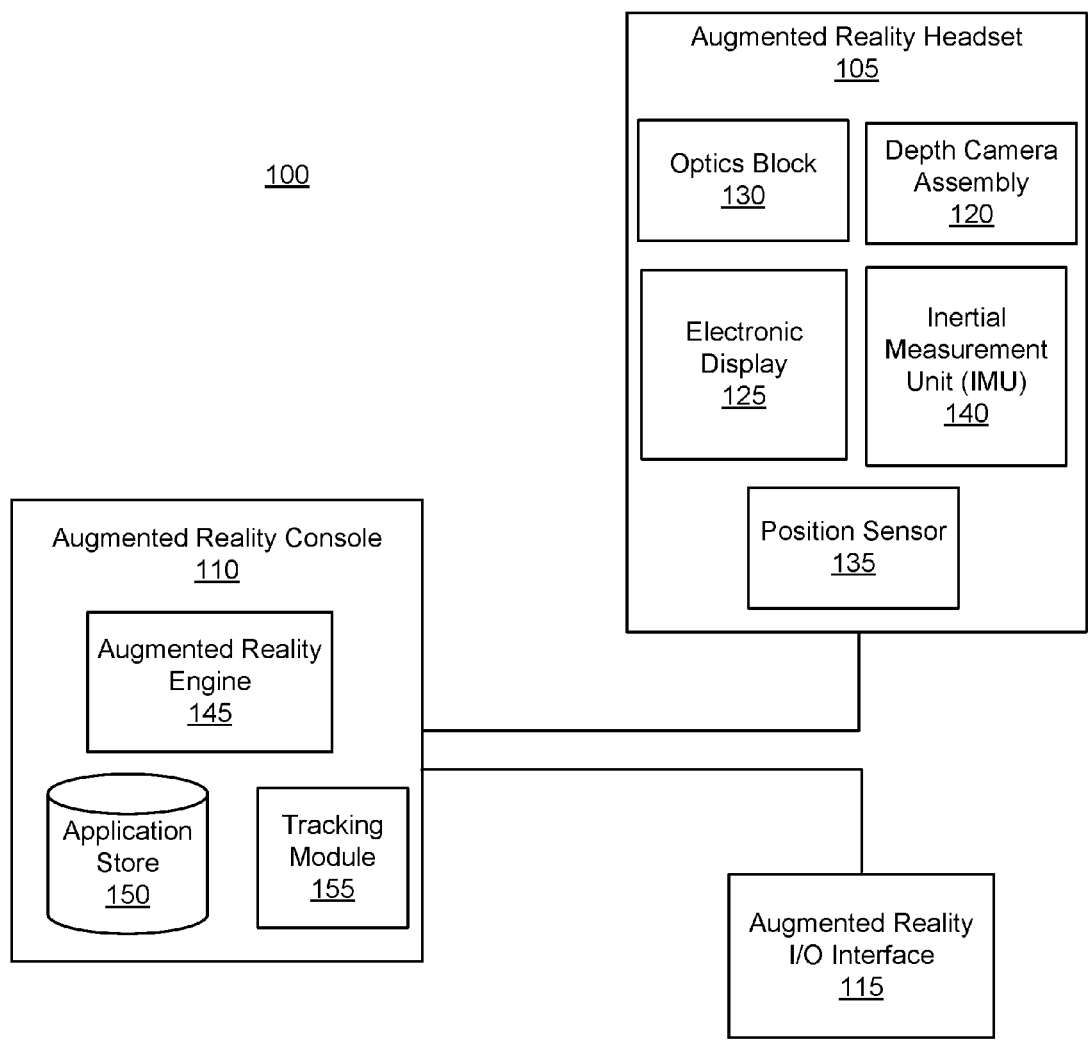
FIG. 1 is a block diagram of a system environment including an augmented reality system, in accordance with an embodiment.

FIG. 1 is a block diagram of one embodiment of an augmented reality (AR) system environment 100 in which an AR console 110 operates. As used herein, an AR system environment 100 may also include virtual reality system environments that present users with virtual environments with which the user may interact. The AR system environment 100 shown by FIG. 1 comprises an AR headset 105 and an AR input/output (I/O) interface 115 that are each coupled to an AR console 110. While FIG. 1 shows an example system 100 including one AR headset 105 and one AR I/O interface 115, in other embodiments any number of these components may be included in the AR system environment 100. For example, there may be multiple AR headsets 105 each having an associated AR I/O interface 115, with each AR headset 105 and AR I/O interface 115 communicating with the AR console 110. In alternative configurations, different and/or additional components may be included in the AR system environment 100. Additionally, functionality described in conjunction with one or more of the components shown in FIG. 1 may be distributed among the components in a different manner than described in conjunction with FIG. 1 in some embodiments. For example, some or all of the functionality of the AR console 110 is provided by the AR headset 105.

The AR headset 105 is a head-mounted display that presents content to a user comprising augmented views of a physical, real-world environment with computer-generated elements (e.g., two dimensional (2D) or three dimensional (3D) images, 2D or 3D video, sound, etc.). In some embodiments, the presented content includes audio that is presented via an external device (e.g., speakers and/or headphones) that receives audio information from the AR headset 105, the AR console 110, or both, and presents audio data based on the audio information. An embodiment of the AR headset 105 is further described below in conjunction with FIGS. 2 and 3. The AR headset 105 may comprise one or more rigid bodies, which may be rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other.

The AR headset 105 includes a depth camera assembly (DCA) 120, an electronic display 125, an optics block 130, one or more position sensors 135, and an inertial measurement Unit (IMU) 140. Some embodiments of The AR headset 105 have different components than those described in conjunction with FIG. 1. Additionally, the functionality provided by various components described in conjunction with FIG. 1 may be differently distributed among the components of the AR headset 105 in other embodiments.

The DCA 120 enables the capture of visual information in ambient light conditions with a variety of dynamic ranges. Some embodiments of the DCA 120 may include one or more image capture devices (e.g., a camera, a video camera) and a structured light (SL) source configured to emit a SL pattern. As further discussed below, structured light projects a specified pattern, such as a symmetric or quasi-random grid or horizontal bars, onto a scene. Based on deformation of the pattern when projected onto surfaces, depth and surface information of objects within the scene is determined. Hence, example illumination sources emit a grid or series of horizontal bars onto an environment surrounding the AR headset 105. The image capture devices capture and record particular ranges of wavelengths of light (i.e., "bands" of light). Example bands of light captured by an image capture device include: a visible band (~380 nm to 750 nm), an infrared (IR) band (~750 nm to 1500 nm), an ultraviolet band (10 nm to 380 nm), another portion of the electromagnetic spectrum, or some combination thereof. The one or more image capture devices may also be sensitive to light having visible wavelengths as well as light having IR wavelengths or wavelengths in other portions of the electromagnetic spectrum. For example, the image capture devices are red, green, blue, IR (RGBI) cameras. In some embodiments, the one or more image capture devices comprise a charge coupled device (CCD), a complementary metal-oxide-semiconductor (CMOS) imager, other light sensitive device, or some combination thereof. Additionally, the DCA 120 may include one or more sensors for determining a signal to noise ratio of images captured by one or more of the image capture devices or for determining any other suitable metrics.

The DCA 120 is configured to capture one or more images of an area proximate to the AR headset 105, also referred to as a "local area," using the one or more image capture devices included in the DCA 120. Different image capture devices in the DCA 120 are configured to capture images including portions of the SL pattern projected by the illumination source (i.e., a "SL element") or to capture representations of the local area in fields of view of different image capture devices. In some embodiments, at least a set of the captured images include one or more SL elements. In various embodiments, images captured by an image capture device provide light intensity information for selecting an imaging mode of the DCA 120, as further described in conjunction with FIGS. 5 and 6. Additionally, the DCA 120 may receive one or more inputs from the AR console 110 to adjust one or more imaging parameters (e.g., focal length, focus, frame rate, ISO, sensor temperature, shutter speed, aperture, etc.) for capturing images of the local area. In an embodiment, the DCA 120 includes two RGBI cameras and an IR laser each configured to operate in one of multiple imaging modes based on ambient light levels and visual dynamic range, allowing the DCA to modify the imaging modes based on one or more threshold conditions, as further described below in conjunction with FIGS. 5 and 6.

The electronic display 125 displays 2D or 3D images to the user in accordance with data received from the AR console 110. In various embodiments, the electronic display 125 comprises a single electronic display or multiple electronic displays (e.g., a display for each eye of a user). Examples of the electronic display 125 include: a liquid crystal display (LCD), an organic light emitting diode (OLED) display, an active-matrix organic light-emitting diode display (AMOLED), some other display, or some combination thereof.

The optics block 130 magnifies image light received from the electronic display 125, corrects optical errors associated with the image light, and presents the corrected image light to a user of the AR headset 105. In various embodiments, the optics block 130 includes one or more optical elements. Example optical elements included in the optics block 130 include: an aperture, a Fresnel lens, a convex lens, a concave lens, a filter, or any other suitable optical element that affects image light. Moreover, the optics block 130 may include combinations of different optical elements. In some embodiments, one or more of the optical elements in the optics block 130 may have one or more coatings, such as anti-reflective coatings.

Magnification and focusing of the image light by the optics block 130 allows the electronic display 125 to be physically smaller, weigh less, and consume less power than larger displays. Additionally, magnification may increase the field of view of the content presented by the electronic display 125. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 130 may be designed to correct one or more types of optical error. Examples of optical error include barrel distortions, pincushion distortions, longitudinal chromatic aberrations, or transverse chromatic aberrations. Other types of optical errors may further include spherical aberrations, comatic aberrations, or errors due to the lens field curvature, astigmatisms, or any other type of optical error. In some embodiments, content provided to the electronic display 125 for display is pre-distorted, and the optics block 130 corrects the distortion when it receives image light from the electronic display 125 generated based on the content.

The IMU 140 is an electronic device that generates data indicating a position of the AR headset 105 based on measurement signals received from one or more of the position sensors 135 and from ambient light levels received from the DCA 120. A position sensor 135 generates one or more measurement signals in response to motion of the AR headset 105. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 generates data indicating an estimated current position of the AR headset 105 relative to an initial position of the AR headset 105. For example, the position sensors 135 include multiple accelerometers to measure translational motion (forward/back, up/down, left/right) and multiple gyroscopes to measure rotational motion (e.g., pitch, yaw, and roll). In some embodiments, the IMU 140 rapidly samples the measurement signals and calculates the estimated current position of the AR headset 105 from the sampled data. For example, the IMU 140 integrates the measurement signals received from the accelerometers over time to estimate a velocity vector and integrates the velocity vector over time to determine an estimated current position of a reference point on the AR headset 105. Alternatively, the IMU 140 provides the sampled measurement signals to the AR console 110, which interprets the data to reduce error. The reference point is a point that may be used to describe the position of the AR headset 105. The reference point may generally be defined as a point in space or a position related to the AR headset's 105 orientation and position.

The IMU 140 receives one or more parameters from the AR console 110. As further discussed below, the one or more parameters are used to maintain tracking of the AR headset 105. Based on a received parameter, the IMU 140 may adjust one or more IMU parameters (e.g., sample rate). In some embodiments, certain parameters cause the IMU 140 to update an initial position of the reference point so it corresponds to a next position of the reference point. Updating the initial position of the reference point as the next calibrated position of the reference point helps reduce accumulated error associated with the current position estimated the IMU 140. The accumulated error, also referred to as drift error, causes the estimated position of the reference point to "drift" away from the actual position of the reference point over time. In some embodiments of the AR headset 105, the IMU 140 may be a dedicated hardware component. In other embodiments, the IMU 140 may be a software component implemented in one or more processors.

The AR I/O interface 115 is a device that allows a user to send action requests and receive responses from the AR console 110. An action request is a request to perform a particular action. For example, an action request may be an instruction to start or end capture of image or video data or an instruction to perform a particular action within an application. The AR I/O interface 115 may include one or more input devices. Example input devices include: a keyboard, a mouse, a game controller, or any other suitable device for receiving action requests and communicating the action requests to the AR console 110. An action request received by the AR I/O interface 115 is communicated to the AR console 110, which performs an action corresponding to the action request. In some embodiments, the AR I/O interface 115 includes an IMU 140, as further described above, that captures calibration data indicating an estimated position of the AR I/O interface 115 relative to an initial position of the AR I/O interface 115. In some embodiments, the AR I/O interface 115 may provide haptic feedback to the user in accordance with instructions received from the AR console 110. For example, haptic feedback is provided when an action request is received, or the AR console 110 communicates instructions to the AR I/O interface 115 causing the AR I/O interface 115 to generate haptic feedback when the AR console 110 performs an action.

The AR console 110 provides content to the AR headset 105 for processing in accordance with information received from one or more of: the DCA 120, the AR headset 105, and the AR I/O interface 115. In the example shown in FIG. 1, the AR console 110 includes an application store 150, a tracking module 155, and an AR engine 145. Some embodiments of the AR console 110 have different modules or components than those described in conjunction with FIG. 1. Similarly, the functions further described below may be distributed among components of the AR console 110 in a different manner than described in conjunction with FIG. 1.

The application store 150 stores one or more applications for execution by the AR console 110. An application is a group of instructions, that when executed by a processor, generates content for presentation to the user. Content generated by an application may be in response to inputs received from the user via movement of the AR headset 105 or the AR I/O interface 115. Examples of applications include: gaming applications, conferencing applications, video playback applications, or other suitable applications.

The tracking module 155 calibrates the AR system environment 100 using one or more calibration parameters and may adjust one or more calibration parameters to reduce error in determination of the position of the AR headset 105 or of the AR I/O interface 115. For example, the tracking module 155 communicates a calibration parameter to the DCA 120 to adjust the focus of the DCA 120 to more accurately determine positions of SL elements captured by the DCA 120. Calibration performed by the tracking module 155 also accounts for information received from the IMU 140 in the AR headset 105 and/or an IMU 140 included in the AR I/O interface 115. Additionally, if tracking of the AR headset 105 is lost (e.g., the DCA 120 loses line of sight of at least a threshold number of SL elements), the tracking module 140 may re-calibrate some or the entire AR system environment 100.

The tracking module 155 tracks movements of the AR headset 105 or of the AR I/O interface 115 using sensor data information from the DCA 120, the one or more position sensors 135, the IMU 140 or some combination thereof. For example, the tracking module 155 determines a position of a reference point of the AR headset 105 in a mapping of a local area based on information from the AR headset 105. The tracking module 155 may also determine positions of the reference point of the AR headset 105 or a reference point of the AR I/O interface 115 using data indicating a position of the AR headset 105 from the IMU 140 or using data indicating a position of the AR I/O interface 115 from an IMU 140 included in the AR I/O interface 115, respectively. Additionally, in some embodiments, the tracking module 155 may use portions of data indicating a position or the AR headset 105 from the IMU 140 as well as representations of the local area from the DCA 120 to predict a future location of the AR headset 105. The tracking module 155 provides the estimated or predicted future position of the AR headset 105 or the AR I/O interface 115 to the AR engine 145.

The AR engine 145 generates a 3D mapping of the local area based on stereoscopic information or the deformation of images of projected SL elements received from the AR headset 105. In some embodiments, the AR engine 145 determines depth information for the 3D mapping of the local area based on stereoscopic images captured by image capture devices in the DCA 120 of the AR headset 105. Additionally or alternatively, the AR engine 145 determines depth information for the 3D mapping of the local area based on images of deformed SL elements captured by the DCA 120 of the AR headset 105. Depth mapping of the local area from information received from the DCA 120 is further described below in conjunction with FIG. 5.

The AR engine 145 also executes applications within the AR system environment 100 and receives position information, acceleration information, velocity information, predicted future positions, or some combination thereof, of the AR headset 105 from the tracking module 155. Based on the received information, the AR engine 145 determines content to provide to the AR headset 105 for presentation to the user. For example, if the received information indicates that the user has looked to the left, the AR engine 145 generates content for the AR headset 105 that mirrors the user's movement in a virtual environment or in an environment augmenting the local area with additional content. Additionally, the AR engine 145 performs an action within an application executing on the AR console 110 in response to an action request received from the AR I/O interface 115 and provides feedback to the user that the action was performed. The provided feedback may be visual or audible feedback via the AR headset 105 or haptic feedback via the AR I/O interface 115.

Figure 2:
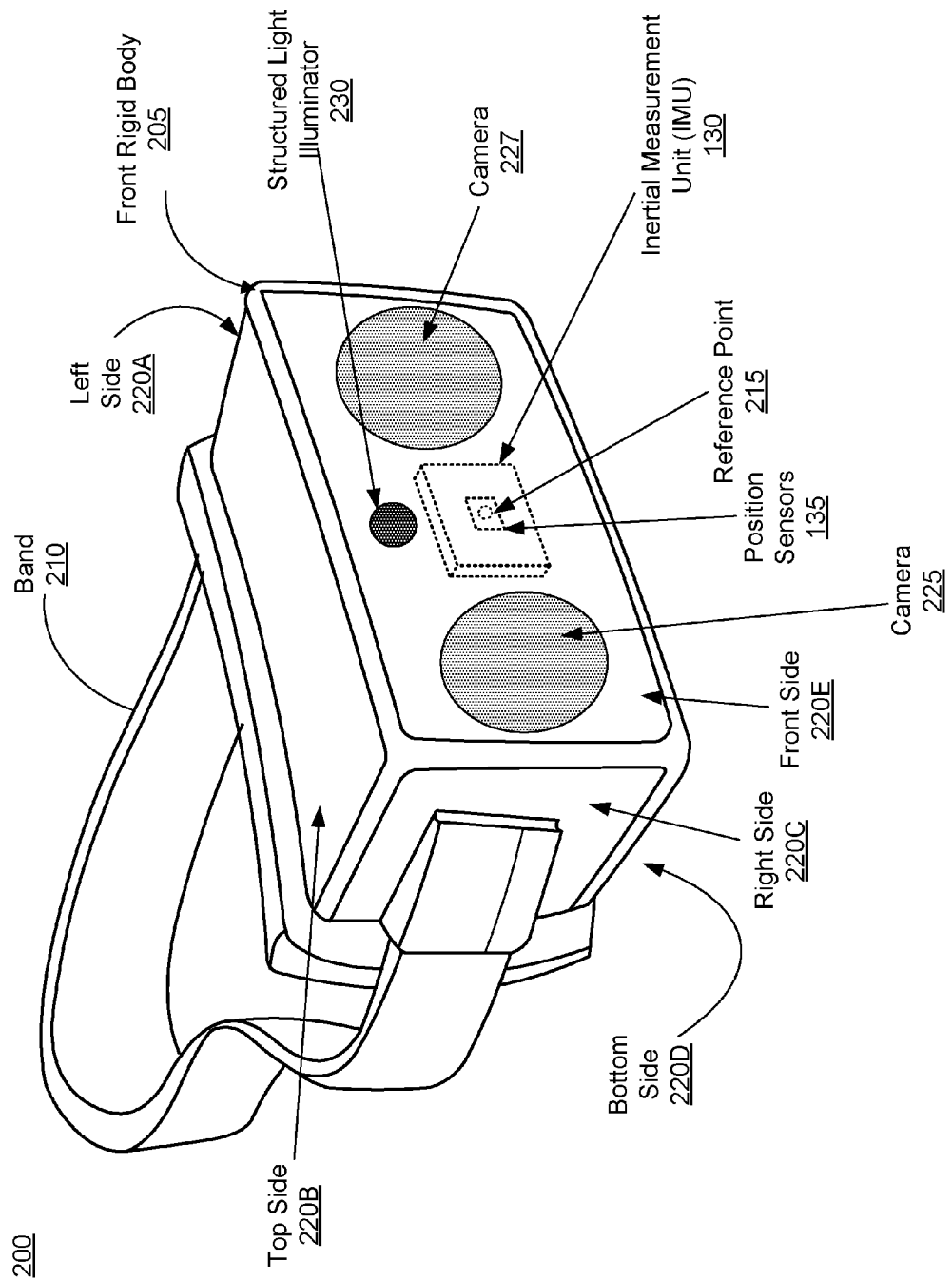
FIG. 2 is a diagram of an augmented reality headset, in accordance with an embodiment.

FIG. 2 is a wire diagram of one embodiment of an AR headset 200. The AR headset 200 is an embodiment of the AR headset 105, and includes a front rigid body 205, a band 210, a reference point 215, a left side 220A, a top side 220B, a right side 220C, a bottom side 220D, and a front side 220E. The AR headset 200 shown in FIG. 2 also includes an embodiment of a depth camera assembly (DCA) 120 comprising a camera, 225, an additional camera 227, and a structured light (SL) illuminator 230, which are further described below in conjunction with FIGS. 3 and 4. The front rigid body 205 includes one or more electronic display elements of the electronic display 125 (not shown), the IMU 130, the one or more position sensors 135, and the reference point 215.

In the embodiment shown by FIG. 2, the AR headset 200 includes a DCA 120 comprising a camera 225 and an additional camera 227 separated by a known distance and having a common field of view, as well as an SL illuminator 230 configured to project a known pattern (e.g., a grid, a series of lines, a pattern of symmetrical or quasi-randomly oriented dots) onto the local area. The camera 225 and the additional camera 227—capture images of the local area, which are used to calculate a depth image of the local area, as further described below in conjunction with FIGS. 3-6.

Figure 3:
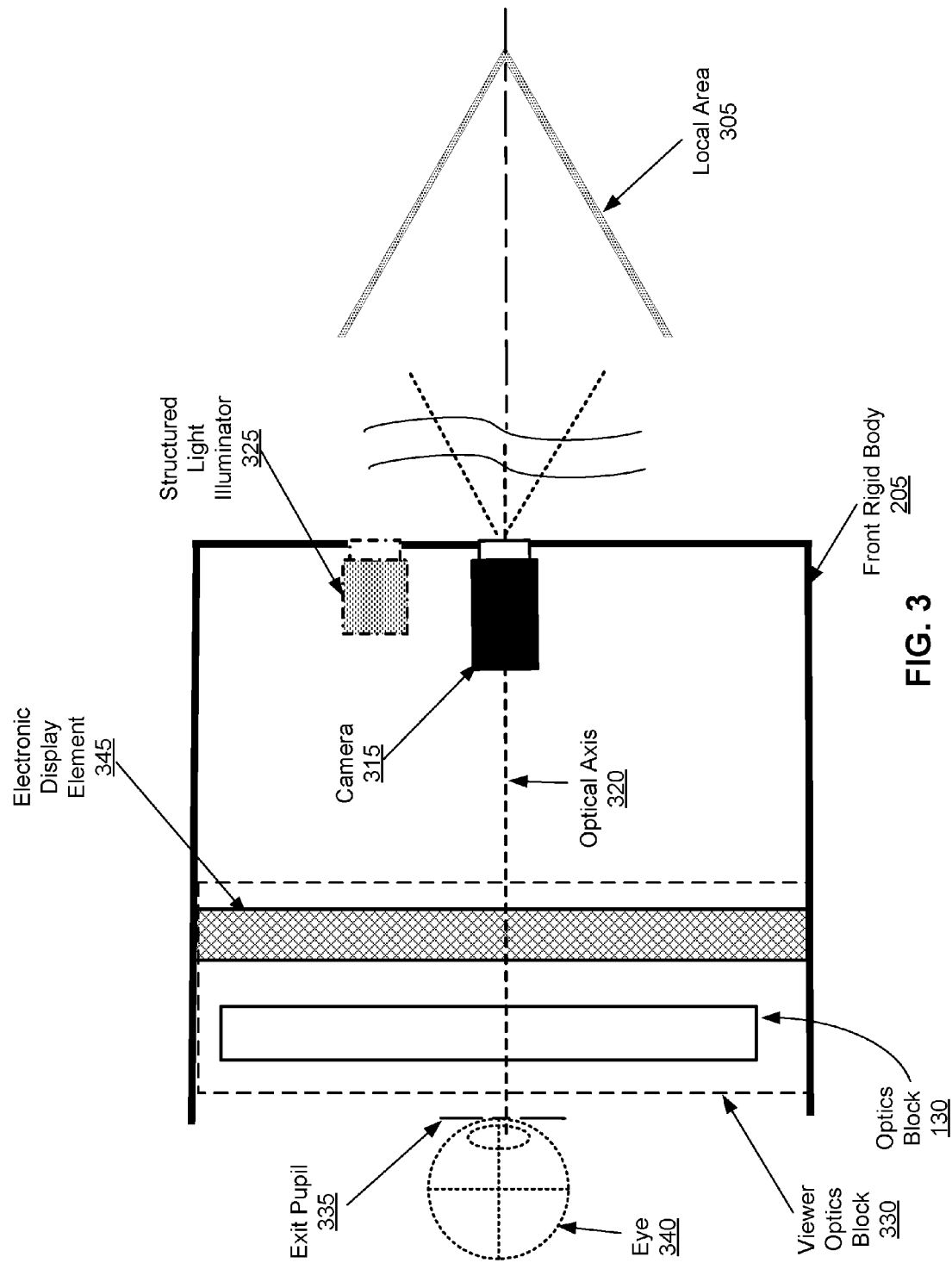
FIG. 3 is a cross section of a front rigid body of an augmented reality headset, in accordance with an embodiment.

FIG. 3 is a cross section of the front rigid body 205 of the AR headset 200 depicted in FIG. 2. As shown in FIG. 3, the front rigid body 205 includes a camera 315 and a SL illuminator 325. The front rigid body 205 has an optical axis 320 corresponding to a path along which light propagates through the front rigid body 205. In the example of FIG. 3, the camera 315 is positioned along the optical axis 320 and captures images of a local area 305, which is a portion of an environment surrounding the front rigid body 205 within a field of view of the camera 315. Additionally, the front rigid body 205 includes the electronic display 125 and the optics block 130, further described above in conjunction with FIG. 1. The front rigid body 205 also includes an exit pupil 335 where the user's eye 340 is located. For purposes of illustration, FIG. 3 shows a cross section of the front rigid body 205 in accordance with a single eye 340.

The local area 305 reflects incident ambient light as well as light projected by the SL illuminator 325. As shown in FIG. 3, the SL illuminator 325 is positioned along an axis parallel to the optical axis 320, while the camera 315 is positioned along the optical axis 320. As shown in FIGS. 2 and 3, the SL illuminator 325 is positioned in a different plane parallel to the optical axis 320 than a plane parallel to the optical axis 320 including the camera 315. The SL illuminator 325 and the camera 315 are further described above in conjunction with the DCA 120 in FIG. 1.

As described above in conjunction with FIG. 1, the electronic display element 125 emits light forming an image toward the optics block 130, which alters the light received from the electronic display element 125. The optics block 130 directs the altered image light to the exit pupil 335, which is a location of the front rigid body 205 where a user's eye 340 is positioned. As described above, FIG. 3 shows a cross section of the front rigid body 205 for a single eye 340 of the user, with another electronic display 125 and optics block 130 separate from those shown in FIG. 3 included in the front rigid body 205 to present an augmented representation of the local area 305 or other content to another eye of the user.

Figure 4:
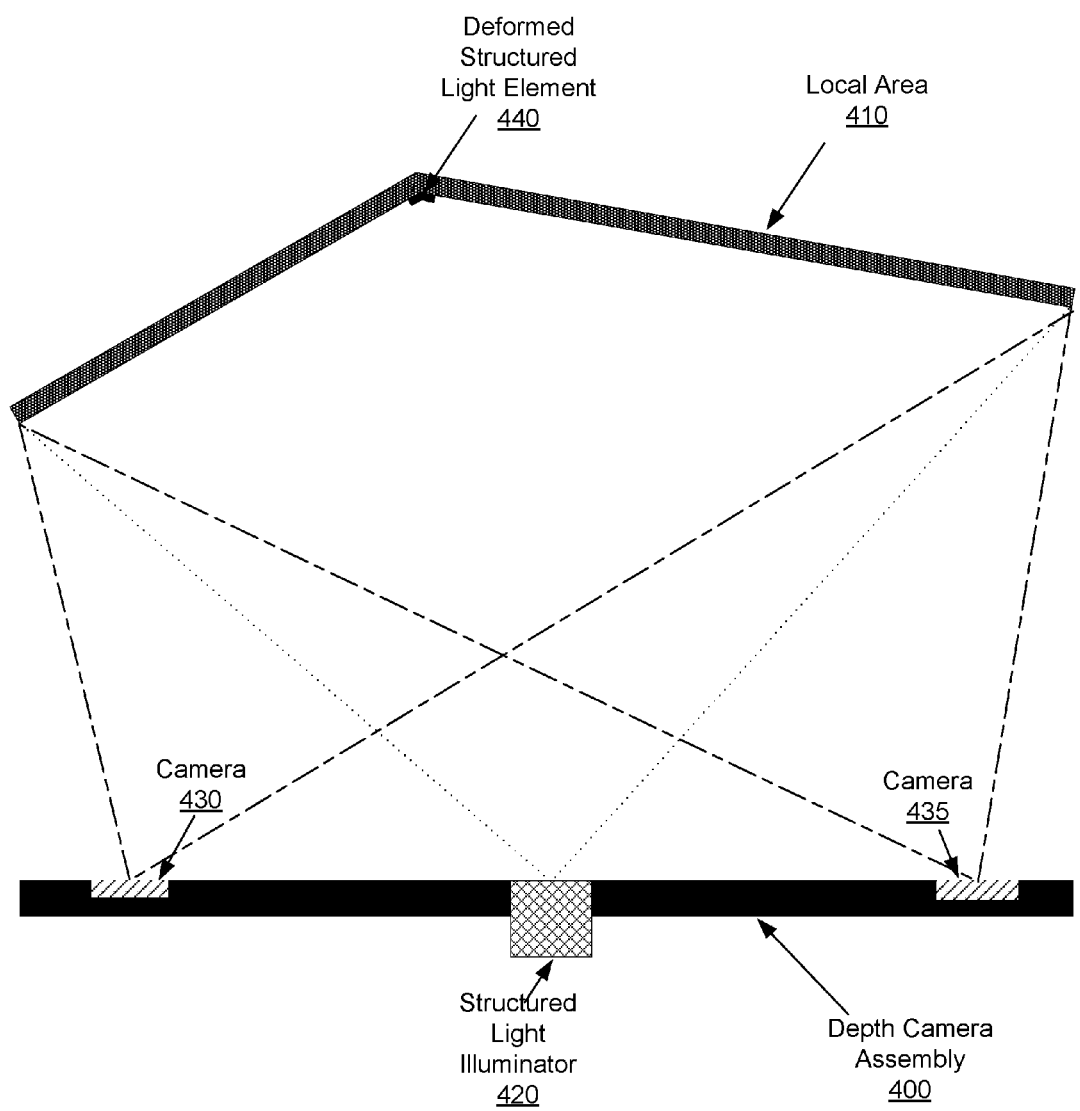
FIG. 4 is an example of a local area illuminated by a structured light source with light reflected by the local area captured by cameras, in accordance with an embodiment.

FIG. 4 is an example of an image being captured by an embodiment of an AR headset 105 including a DCA 400. In the example of FIG. 4, the DCA 400 operates in a particular imaging mode and captures images of a local area 410 surrounding the AR headset 105. As further described above in conjunction with FIGS. 1 and 3, the DCA 400 in FIG. 4 includes a structured light (SL) illuminator 420, a camera 430, and an additional camera 435, with the camera 430 and the additional camera 435 separated by a known difference and having overlapping fields of view. The SL illuminator 420 is positioned between the camera 430 and the additional camera 435, such as at a midpoint of a plane perpendicular to lenses included in the camera 430 and in the additional camera 435 or another location within the plane perpendicular to lenses included in the camera 430 and in the additional camera 435 (allowing the SL illuminator 420 to be positioned closer to the camera 430 or the additional camera 435). In another embodiment the SL illuminator 420 is positioned so the SL illuminator 420, the camera 430, and the additional camera 435 are arranged to form an approximately equilateral triangle. The exact separation distances between the SL illuminator 420, the camera 430, and the additional camera 435 helps define the 3D sensitivity and expected lateral image shift due to triangulation from the viewpoint offsets, but may otherwise be modified to optimize various criteria in different embodiments.

The DCA 400 may operate in various imaging modes by selecting an imaging mode for operation based on parameters such as a signal to noise ratio (SNR) in images captured by the camera 430 or by the additional camera 435 when the SL illuminator 420 is not illuminating the local area 410, with the SNR affected by ambient light levels in the local area 410. As further described below in conjunction with FIGS. 5 and 6, the DCA 400 determines the SNR of images captured by one or more of the camera 430 and the additional camera 435 and determines an imaging mode based on the determined SNR. For example, the DCA 400 determines a range that includes the determined SNR and selects an imaging mode associated with the range including the determined SNR. For example, if the SNR of an image of the local area 410 captured by the camera 430 when the SL illuminator 420 is not illuminating the local area 410, exceeds a threshold value, the DCA 400 determines depth information of the local area 410 by stereo matching images captured by the camera 430 and by the additional camera 435. In the preceding example, if the SNR is less than the threshold value and less than an additional threshold value, the DCA 400 illuminates the local area 410 with the SL illuminator 420 and determines depth information for the local area 410 from images of the pattern projected onto the local area 410 by the SL illuminator 420. In addition, based upon variable ambient light levels across the local area 410, the DCA 400 may interleave captured images for stereo and asymmetric SL to merge disparate data sets. In this example, the DCA 400 may operate a base stereo pair comprising the camera 430 and the additional camera 435, a right SL pair comprising the SL illuminator 420 and the camera 430, a left SL pair comprising the SL illuminator 420 and the additional camera 435, or an assisted stereo combination that operates the SL illuminator 420 while collecting stereo data from the camera 430 and the additional camera 435. The assisted stereo combination may be operated where spatial frequency or radiance dynamic variation in the local area 410 is not unique enough under ambient illumination to uniquely solve the stereo matching input. However, the DCA 400 may select from any number of imaging modes in various embodiments, as further described below in conjunction with FIGS. 5 and 6.

Figure 5:
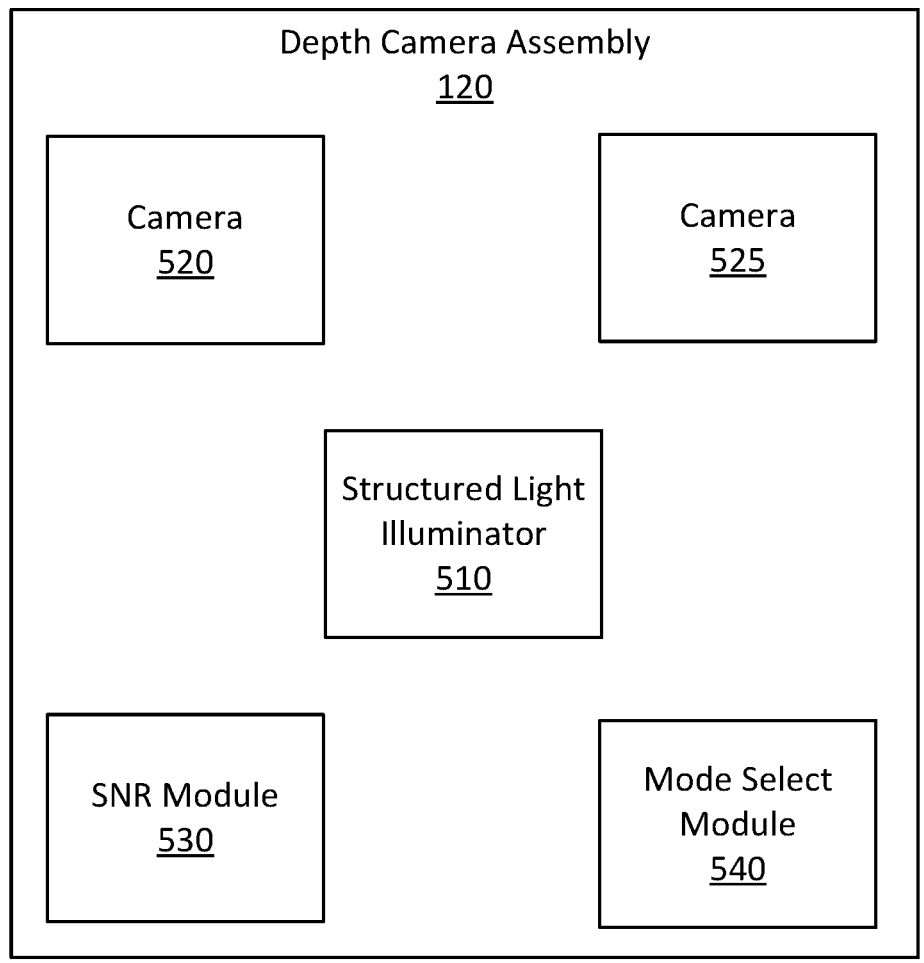
FIG. 5 is a block diagram of a depth camera assembly, in accordance with and embodiment.

FIG. 5 is a block diagram of one embodiment of the DCA 120. In the example shown by FIG. 5, the DCA 120 includes a SL illuminator 510, a camera 520, an additional camera 525, a SNR module 530, and a mode select module 540. In other embodiments, the DCA 120 may include different and/or additional components than those shown in FIG. 5. As further described above in conjunction with FIGS. 1 and 4, the camera 520 and the additional camera 525 have overlapping fields of view and are separated by a known distance. The camera 520 and the additional camera 525 each capture images of a local area of an environment surrounding an AR headset 105 including the DCA 120 that is within the fields of view of the camera 520 and the additional camera 525. The structured light (SL) illuminator 510 projects a SL pattern, such as a quasi-random dot pattern, grid, or horizontal bars, onto the local area. For example, a SL pattern comprises one or more geometrical elements of known width and height, allowing calculation of deformation of various geometrical elements when the SL pattern is projected onto the local area to provide information about the objects in the local area.

The DCA 120 is capable of operating in different imaging modes that differently capture images of the local area. In various embodiments, the imaging mode in which the DCA 120 operates is determined based at least in part on the signal to noise ratio (SNR) of one or more images captured by one or more of the camera 520 and the additional camera 525. The DCA 120 may also determine a contrast ratio associated with at least one of the one or more images of the local area captured by the camera 520 and the additional camera 525. For example, in addition to the SNR, the DCA 120 also determines a contrast ratio that is the ratio of the luminance of the brightest color (e.g., white) to the darkest color (e.g., black) in a local area. In an embodiment, the SNR determined by the DCA 120 is a combination of the determined SNR and the determined contrast ratio.

In some embodiments, the DCA 120 determines an imaging mode based on a SNR of one or more images captured by the camera 520 and the additional camera 525 as well as a measure of spatial variance of the one or more images. The spatial variance of an image is based on a variance of magnitudes or intensities of pixels at different locations in the image, and is based on spatial frequency content of the local area. As the SNR depends in part on ambient light conditions in the local area, the DCA 120 operates in different imaging modes based on the ambient light in the local area. When using SNR and spatial variance to select an imaging mode, the imaging mode in which the DCA 120 operates is based on both ambient light and spatial frequency content in the local area. In various embodiments, the SNR module 530 receives image data from images captured by the camera 520 or by the additional camera 525 (e.g., images captured while the SL illuminator 510 is not illuminating the local area) and determines a SNR from the received image data. The spatial variance may also be determined by the SNR module 530 from the received image data in various embodiments. Alternatively or additionally, the SNR module 530 receives data from one or more light intensity sensors (e.g., light intensity sensors included in the DCA 120, included in the AR headset 105, or otherwise communicating information to a component in the AR system environment 100) and determines the SNR based on the data from the light intensity sensors. In some embodiments, the SNR module 530 determines the SNR at periodic intervals. For example, the SNR module 530 determines a SNR for an image by passing the raw image through one or more corrective filters (field-balancing, power correction, vignetting correction, etc.), and applying local signal slope derivative filters to remove ambient illumination frequency content lower than a minimum value (e.g., frequency content lower than the SL illumination) from the image After removing the frequency content lower than the minimum value, a measure of the signal equaling or exceeding a threshold value is compared to a minimum signal (dark) floor of the device capturing light intensity data (e.g., the camera, the additional camera, a light intensity sensor to determine a SNR for the image. Determination of SNR and spatial variance for an image is further described below in conjunction with FIG. 6.

The mode select module 540 selects an imaging mode from multiple modes based at least in part on the SNR determined by the SNR module 530. In embodiments where the SNR module 530 determines a spatial variance, the mode select module 540 also selects the imaging mode based at least in part on the spatial variance. Based on the selected imaging mode, the mode select module 540 communicates instructions to one or more of the camera 520, the additional camera 525, and the SL illuminator 510 to configure the camera 520, the additional camera 525, and the SL illuminator 510. In some embodiments, the mode select module 540 maintains multiple ranges of SNR, with each range bounded by a threshold SNR and an additional threshold SNR. Different ranges are associated with different imaging modes, and the mode select module 540 selects an imaging mode associated with a range that includes the determined SNR in some embodiments. The mode select module 540 may also maintain multiple ranges of spatial variance, with each range bounded by a threshold variance and an additional threshold variance and associated with an imaging mode, so the mode select module 540 selects an imaging mode corresponding to a range of SNR and a range of spatial variance including a SNR and spatial variance determined by the SNR module 530.

In one embodiment, the mode select module 540 maintains a threshold value and an additional threshold value, which differs from the threshold value and is lower than the threshold value, to identify three ranges of SNR, with a different imaging mode associated with each range. If the SNR from the SNR module 530 equals or exceeds the threshold value, the mode select module 540 communicates instructions to the camera 520 and to the additional camera 525 to both capture images of the local area in a color space (e.g., in a red, blue, green color space). Additionally, the SNR module 530 also communicates instructions to the SL illuminator 510 to deactivate the SL illuminator 510 if the SNR from the SNR module 530 equals or exceeds the threshold value. Capturing color images or the local environment form both cameras allows determination of high-resolution depth information of the local environment based on pixel to pixel correlation between different images captured by the camera 520 and by the additional camera 525.

However, if the received SNR from the SNR module 530 is less than the threshold value and greater than the additional threshold value, the mode select module 540 communicates instructions to the SL illuminator 510 to project the SL pattern onto the local area. Additionally, the mode select module 540 communicates instructions to the camera 520 to capture images of the local area in a color space (such as red, blue, green) and communicates instructions to the additional camera 525 to capture images of the local area in a range of wavelengths including wavelengths with which the SL illuminator 510 projects. For example, if the SL illuminator 510 projects the SL pattern via infrared light, the instructions configure the additional camera 525 to detect infrared wavelengths and capture images of the detected infrared wavelengths. Additionally, the DCA 120 retrieves image data from the camera 520 and from the additional camera 525 synchronously or asynchronously to interleave the image data retrieved from the camera 520 and from the additional camera 525, which obtains depth information about the local area. Retrieving image data from the camera 520 and from the additional camera 525 simultaneously or within a threshold amount in time or space (relative to motion) provides information to fill in shadows in image data within image data captured by the camera 520 based on the separation of the camera 520 and the additional camera 525 by a known distance and have similar and overlapping fields of view.

If the SNR received from the SNR module 530 is less than or equal to the additional threshold value, the mode select module 540 communicates instructions to the SL illuminator 510 to project the SL pattern onto the local area. Additionally, the mode select module 540 communicates instructions to the camera 520 and to the additional camera 525 to capture images of the local area in a range of wavelengths including wavelengths with which the SL illuminator 510 projects. For example, if the SL illuminator 510 projects the SL pattern via infrared wavelengths of light, the instructions communicated to the camera 520 and to the additional camera 525 cause the camera 520 and the additional camera 525 to detect and capture images of infrared wavelengths. For example, if ambient light in the local area is low enough for the mode select module 540 to select this imaging mode, the camera 520 and the additional camera 525 capture wavelengths between approximately 750 and 900 nanometers (as most red, blue, green Bayer filters that may be used by the camera 520 or by the additional camera 525 allow approximately equal amounts of infrared light to pass). Hence, this imaging mode captures information about the local area in infrared wavelengths with the SL illuminator 510, given knowledge that the ambient light conditions are below a defined threshold. Based on image data of the SL pattern projected onto the local area obtained from the camera 520 and from the additional camera 525, the DCA 120 performs coarse and fine stereo matching to obtain coarse depth information about the local area. Additionally, the mode select module 540 may communicate instructions to the SL illuminator 510, the camera 520, and the additional camera 525 that cause the SL illuminator 510 and the camera 520 may operate to from a "right" data pair, while the SL illuminator 510 and the additional camera 525 may operate to form a "left" data pair. The pairing of SL illuminator 510 and the camera 520 and the pairing of the SL illuminator 510 and the additional camera 525 are asymmetrical, which allows extraction of three-dimensional information and correction of missing locations in image data through overlay comparisons. In other embodiments, the mode select module 540 may select form any number of imaging modes and may use any suitable criteria to select an imaging mode.

In other embodiments, the mode select module 540 maintains a minimum SNR and a minimum spatial variance and compares a SNR and a spatial variance determined by the SNR module 530 to the minimum SNR and to the minimum spatial variance. If the SNR from the SNR module 530 equals or exceeds the minimum SNR and the spatial variance from the SNR module 530 exceeds the minimum spatial variance, the mode select module 540 communicates instructions to the camera 520 and to the additional camera 525 to both capture images of the local area in a color space (e.g., in a red, blue, green color space). Additionally, the SNR module 530 communicates instructions to the SL illuminator 510 to deactivate the SL illuminator 510 if the SNR from the SNR module 530 equals or exceeds the minimum SNR and the spatial variance from the SNR module 530 equals or exceeds the minimum spatial variance. If the SNR from the SNR module 530 is less than the minimum SNR and the spatial variance from the SNR module 530 equals or exceed the minimum spatial variance, the mode select module 540 communicates instructions to the SL illuminator 510 to project the SL pattern onto the local area and communicates instructions to the camera 520 or to the additional camera 525 to capture data from pairings of the SL illuminator 510 and the camera 520 and of the SL illuminator 510 and the additional camera 525. If the SNR from the SNR module 530 equals or exceeds the minimum SNR and the spatial variance from the SNR module 530 is less than the minimum spatial variance, the mode select module 540 communicates instructions to the SL illuminator 510 to project the SL pattern onto the local area. Additionally, the mode select module 540 communicates instructions to the camera 520 and to the additional camera 525 to capture images of the local area in a range of wavelengths including wavelengths with which the SL illuminator 510 projects.

Figure 6:
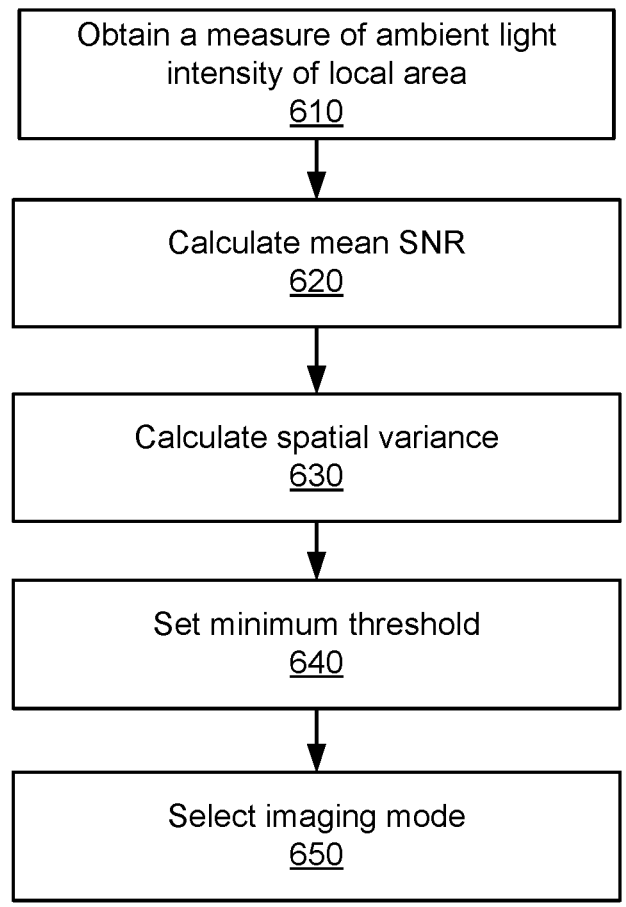
FIG. 6 is a flowchart of a process for determining depth information of a scene, in accordance with an embodiment.

FIG. 6 is a flowchart of one embodiment of a process for selecting an imaging mode for a depth camera assembly 120. The functionality described in conjunction with FIG. 6 may be performed by the DCA 120 or other components in the AR headset 105 in some embodiments. Alternatively, the functionality described in conjunction with FIG. 6 may be performed other components in the AR system environment 100. Additionally, in some embodiments, the process includes different or additional steps than those described in conjunction with FIG. 6. Moreover, certain embodiments may perform the steps described in conjunction with FIG. 6 in different orders than the order described in conjunction with FIG. 6.

The DCA 120 obtains 610 a measure of ambient light intensity in a local area comprising an environment surrounding an AR headset 105 within the fields of view of image capture devices (e.g., cameras) in the DCA 120. In some embodiments, the DCA 120 obtains 610 the measure of ambient light intensity by analyzing one or more images captured by the image capture devices while the local area is not illuminated by a SL illuminator included in the DCA 120. In some embodiments, an image captured by one or more of the image capture devices are segmented into multiple regions, with each region having a specified dimension. The DCA 120 may alternatively or additionally obtain 610 the measure of ambient light intensity from one or more light intensity sensors included in the DCA 120 or in another component of the AR system environment 100.

The DCA 120 calculates 620 a mean signal to noise ratio (SNR) of an image captured by one or more of the image capture devices. When the DCA 120 segments a captured image into multiple regions, the DCA 120 calculates 620 a mean SNR for various regions of the captured image. In various embodiments, the DCA 120 calculates 620 the mean SNR for a region of a captured image by balancing or correcting the captured image and applying an adaptive mean filter to the balanced or corrected image. In some embodiments, the DCA 120 ranks pixels in the region based on their digital counts and determines an average digital count of pixels having at least a threshold position in the ranking as well as an additional average digital count of pixels having less than an additional threshold position in the ranking. The DCA 120 calculates 620 the mean SNR for the region based on a comparison between the average digital count and the additional average digital count.

In some embodiments, such as the embodiment shown in FIG. 6, the DCA 120 also calculates 630 a spatial variance of the image or of a region of the image. For example, the DCA 120 determines a spatial transform (e.g., a Fourier transform) of a captured image, before application of an adaptive filter or other filter, and identifies frequency content and variance from the spatial transform of the captured image. In some embodiments, the DCA 120 identifies certain frequency content and a variance from the spatial transform of the captured image. The DCA 120 may calculate 620 the SNR and calculate 630 the spatial variance of a captured image or of a region of the captured image in parallel in some embodiments. In other embodiments, the DCA 120 may calculate 630 the spatial variance of the captured image or of the region of the captured image prior to calculating 620 the SNR of the captured image or of the region of the captured image.

In some embodiments, as further described above in conjunction with FIG. 5, the DCA 120 compares 640 the SNR of the captured image or of the region of the captured image to one or more threshold values and selects 650 an imaging mode based on the comparison. Alternatively, also as further described above in conjunction with FIG. 5, the DCA 120 compares 640 the SNR of the captured image or of the region of the captured image to a minimum SNR and compares 640 the spatial variance of the captured image or of the region of the captured image. Based on the comparison, the DCA 120 selects 630 an imaging mode, as further described above in conjunction with FIG. 5. Using selected imaging mode, the DCA 120 captures images of the local area and determines depth information for the local area. The DCA 120 may perform the steps described above for various regions of a captured image, and may perform the steps described above at periodic intervals or when various conditions are satisfied to modify the imaging mode and to more accurately determine depth information for the local area.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A depth camera assembly comprising:
a structured light illuminator configured to emit a structured light pattern onto a local area;
an image capture device configured to capture a set of images of the local area illuminated by the structured light pattern;
an additional image capture device separated from the image capture device by a known distance and having a common field of view with the image capture device, the additional image capture device configured to capture a set of additional images of the local area illuminated by the structured light pattern; and
a mode select module coupled to the image capture device and to the additional image capture device, the mode select module configured to:
determine an imaging mode of the image capture device, the additional image capture device, and the structured light illuminator based on a signal to noise ratio of one or more images captured by the image capture device or by the additional image capture device, and
communicate instructions for configuring the determined imaging mode to one or more of the image capture device, the additional image capture device, and the structured light illuminator,
wherein the imaging mode is such that, responsive to a first value of the signal to noise ratio, the structured light illuminator is deactivated and at least one of the image capture device and the additional image capture device are activated, and responsive to a second value of the signal to noise ratio that is lower than the first value, the imaging mode is such that the structured light illuminator is activated and at least one of the image capture device and the additional image capture device is activated.

2. The depth camera assembly of claim 1, wherein the mode select module maintains multiple ranges of signal to noise ratios, with different ranges of signal to noise ratio associated with different imaging modes.

3. The depth camera assembly of claim 2, wherein the mode select module is configured to determine the imaging mode of the image capture device, the additional image capture device, and the structured light illuminator as an imaging mode associated with a range of signal to noise ratios including the signal to noise ratio of one or more images captured by the image capture device and by the additional image capture device.

4. The depth camera assembly of claim 1, wherein the mode select module maintains a threshold value of the signal to noise ratio and an additional threshold value of the signal to noise ratio, the additional threshold value is different from the threshold value and lower than the threshold value, and the mode select module is configured to:
determine an imaging mode where the image capture device and the additional image capture device both capture images of the local area in a color space and the structured light illuminator is deactivated in response to determining that the signal to noise ratio of one or more images captured by the image capture device or by the additional image capture device is equal to or exceeds the threshold value;
communicate instructions to the image capture device and to the additional image capture device to capture images of the local area in the color space; and
communicate instructions to the structured light illuminator to deactivate the structured light illuminator.

5. The depth camera assembly of claim 4, wherein the mode select module is further configured to:
determine an alternative imaging mode where the image capture device captures images of the local area in the color space, the additional image capture device captures images of the local area in a range of wavelengths including wavelengths emitted by the structured light illuminator, and the structured light illuminator emits the structured light pattern onto the local area in response to determining that the signal to noise ratio of one or more images captured by the image capture device or by the additional image capture device is less than the threshold value and being greater than the additional threshold value;
communicate instructions to the image capture device to capture images of the local area in the color space;
communicate instructions to the additional image capture device to capture images of the local area in the range of wavelengths including wavelengths emitted by the structured light illuminator; and
communicate instructions to the structured light illuminator to emit the structured light pattern onto the local area.

6. The depth camera assembly of claim 5, wherein the structured light illuminator emits the structured light pattern in infrared wavelengths and the additional image capture device captures images of the local area in infrared wavelengths.

7. The depth camera assembly of claim 5, wherein the depth camera assembly is configured to retrieve images captured by the image capture device within a threshold amount of time from retrieving images captured by the additional image capture device.

8. The depth camera assembly of claim 5, wherein the mode select module is further configured to:
determine an additional imaging mode where the image capture device and the additional image capture device captures images of the local area in a range of wavelengths including wavelengths emitted by the structured light illuminator, and the structured light illuminator emits the structured light pattern onto the local area in response to determining that the signal to noise ratio of one or more images captured by the image capture device or by the additional image capture device being less than or equal to the additional threshold value;
communicate instructions to the image capture device to capture images of the local area in the range of wavelengths including wavelengths emitted by the structured light illuminator;
communicate instructions to the additional image capture device to capture images of the local area in the range of wavelengths including wavelengths emitted by the structured light illuminator; and
communicate instructions to the structured light illuminator to emit the structured light pattern onto the local area.

9. The depth camera assembly of claim 8, wherein the structured light illuminator emits the structured light pattern in infrared wavelengths and the image capture device and the additional image capture device captures images of the local area in infrared wavelengths.

10. The depth camera assembly of claim 1, wherein the mode select module is configured to:
determine an imaging mode of the image capture device, the additional image capture device, and the structured light illuminator based on the signal to noise ratio and a spatial variance of one or more images captured by the image capture device or by the additional image capture device.

11. The depth camera assembly of claim 10, wherein determine an imaging mode of the image capture device, the additional image capture device, and the structured light illuminator based on the signal to noise ratio and the spatial variance of one or more images captured by the image capture device or by the additional image capture device comprises:
determine an imaging mode where the image capture device and the additional image capture device both capture images of the local area in a color space and the structured light illuminator is deactivated in response to the signal to noise ratio of one or more images captured by the image capture device or by the additional image capture device equaling or exceeding a minimum signal to noise ratio and in response to the spatial variance equaling or exceeding a minimum spatial variance;
determine an alternative imaging mode where the structured light illuminator emits the structured light pattern onto the local area, a pairing of the image capture device and the structured light illuminator captures images of the local area, and a pairing of the additional image capture device and the structured light illuminator captured images of the local area, in response to the signal to noise ratio being less than the minimum signal to noise ratio and in response to the spatial variance equaling or exceeding the minimum spatial variance; and
determine an additional imaging mode where the image capture device and the additional image capture device capture images of the local area in a range of wavelengths including wavelengths emitted by the structured light illuminator and the structured light illuminator emits the structured light pattern onto the local area in response to the signal to noise ratio equaling or exceeding the minimum signal to noise ratio and in response to the spatial variance being less than the minimum spatial variance.

* * * * *